(12) United States Patent
Dugan et al.

(10) Patent No.: US 7,463,783 B1
(45) Date of Patent: *Dec. 9, 2008

(54) CONSTANT MAGNIFICATION IMAGING METHOD AND SYSTEM

(75) Inventors: Peter J. Dugan, Ithaca, NY (US); Patrick Ouellette, Lanark (CA); Steven J. Pratt, Endwell, NY (US); Michael J. Riess, Chenango Forks, NY (US); Alfred T. Rundle, Endwell, NY (US)

(73) Assignee: Lockheed Martin Corporation, Bethedsa, MD (US)

(*) Notice: Subject to any disclaimer, the term of this patent is extended or adjusted under 35 U.S.C. 154(b) by 1032 days.

This patent is subject to a terminal disclaimer.

(21) Appl. No.: 10/733,705

(22) Filed: Dec. 11, 2003

Related U.S. Application Data

(63) Continuation-in-part of application No. 10/361,350, filed on Feb. 10, 2003, now Pat. No. 7,162,098.

(60) Provisional application No. 60/432,768, filed on Dec. 12, 2002, provisional application No. 60/412,650, filed on Sep. 20, 2002.

(51) Int. Cl.
*G06K 9/36* (2006.01)
*G06K 9/32* (2006.01)
*G06K 9/34* (2006.01)

(52) U.S. Cl. .................................. 382/251; 382/299

(58) Field of Classification Search ................ 382/112, 382/172, 173, 176, 177, 190, 194, 199, 224, 382/232, 237, 251, 254, 276, 299, 300, 305, 382/321; 358/3.03, 400, 445, 447; 348/62
See application file for complete search history.

(56) References Cited

U.S. PATENT DOCUMENTS

| | | | |
|---|---|---|---|
| 5,361,309 A | 11/1994 | Sugiyama | 382/9 |
| 5,608,821 A | 3/1997 | Metcalfe et al. | 382/252 |
| 5,751,855 A | 5/1998 | Saund | 382/224 |
| 5,828,771 A | 10/1998 | Bloomberg | 382/112 |
| 6,055,336 A | 4/2000 | Niki | 382/237 |
| 6,115,482 A | 9/2000 | Sears et al. | 382/114 |

OTHER PUBLICATIONS

Rogelj, P. et al. *Industrial OCR*. Laboratory for Artificial Perception, University of Ljubljana. Retrieved from http://luz.fe.uni.lj.si/english/vision/OCR/ on Feb. 25, 2002.

Srihari, S. et al. *Character Recognition*. Center of Excellence for Document Analysis and Recognition, State University of New York at Buffalo. Retrieved from http://cedar.buffalo.edu/Publications/TechReps/OCR.ocr.html on Feb. 25, 2002.

(Continued)

*Primary Examiner*—Amir Alavi
(74) *Attorney, Agent, or Firm*—Burns & Levinson LLP; Jacob N. Erlich; Kathleen Chapman

(57) ABSTRACT

A system and method for achieving constant magnification of a scanned three-dimensional item without the use of special optics or other specialized hardware. The system includes the dynamic computation of a camera parameter-dependent factor and applying that factor in real-time to the sampled signal resulting from the scan of the item.

22 Claims, 9 Drawing Sheets

OTHER PUBLICATIONS

Trier, O.D. et al. *Goal-Directed Evaluation of Binarization Methods*. Retrieved from http://citeseer.nj.nec.com/trier95goaldirected.html, 1995, 47-58.

Trier, O.D. et al. *Evaluation of Binarization Methods for Document Images*. Retrieved from http://citeseer.nj.nec.com/58710.html, 1995, pp. 31-35.

Meijering, *A Chronology of Interpolation: From Ancient Astronomy to Modern Signal and Image Processing*, Proceedings of the IEEE, 90(3), Mar. 2002, 319-342.

U.S. Appl. No. 60/432,768, filed Dec. 12, 2002. Title: Firmware Solution for Constant Magnification Imaging. Applicants: Michael J. Riess et al.

U.S. Appl. No. 10/361,350, filed Feb. 10, 2003. Title: System and Method for Increasing Temporal and Spatial Capacity of Systems That Amplitude Quantize Data Prior to Processing. Applicants: Peter J. Dugan et al.

U.S. Appl. No. 60/412,650, filed Sep. 20, 2002. Title: System and Method for Increasing Temporal and Spatial Capacity of Systems That Amplitude Quantize Data Prior to Processing. Applicants: Michael J. Riess et al.

CONSTANT MAGNIFICATION IMAGING METHOD AND SYSTEM

CROSS REFERENCE TO RELATED APPLICATIONS

The present application is a continuation-in-part of U.S. patent application Ser. No. 10/361,350, entitled SYSTEM AND METHOD FOR INCREASING TEMPORAL AND SPATIAL CAPACITY OF SYSTEMS THAT AMPLITUDE QUANTIZE DATA PRIOR TO PROCESSING filed on Feb. 10, 2003 now U.S. Pat. No. 7,162,098, which claims priority to U.S. Provisional Application No. 60/412,650 filed Sep. 20, 2002, entitled SYSTEM AND METHOD FOR INCREASING TEMPORAL AND SPATIAL CAPACITY OF SYSTEMS THAT AMPLITUDE QUANTIZE DATA PRIOR TO PROCESSING which is incorporated herein in its entirety by reference. The present application claims priority to U.S. Provisional Application No. 60/432,768 filed on Dec. 12, 2002, entitled FIRMWARE SOLUTION FOR CONSTANT MAGNIFICATION IMAGING which is incorporated herein in its entirety by reference.

BACKGROUND OF THE INVENTION

This invention relates generally to high resolution amplitude data collection, and in particular, to a constant magnification imaging system and method based on firmware up-sampling without specialized optics.

When an image is taken using a standard camera lens objects appear larger when they are closer to the camera than when they are further from the camera. This is due to optical perspective, which causes images of rectangular objects to appear trapezoidal when viewed with one edge of the rectangle closer to the camera than the opposite edge. An example, although not limited thereto, where such a problem is of particular significance is in applications in which parcels are aligned, traveling down a conveyor belt and imaged by a line scan camera, in which the top, bottom, left and right side images are rectangular. However, if an attempt is made to scan the leading or trailing surface of the box, the result is a trapezoidal image. This causes complications with contextual analysis software that is trying to determine if a particular block of text is a destination address, using relative position as one of the deciding factors. The problem is complicated further if the parcels are not aligned on the conveyor belt as they pass the scan line and four out of the six sides are in various degrees of distortion.

To simplify the contextual analysis algorithms required for this function, and thereby accelerate the overall assignment process, methods have been developed to produce "constant magnification" images. These techniques remove the optical perspective property and images of leading and trailing sides of a box appear as if they were perfectly aligned side surfaces, resulting in undistorted rectangular images. However, the current methods for producing constant magnification images are either large and unwieldy, such as telecentric optics, or are made up of high speed mechanisms, such as dynamic zoom/focus lens, that are prone to failure. These devices also add significant cost to the camera system.

SUMMARY OF THE INVENTION

The problems set forth above as well as further and other problems are solved by the present invention. The solutions and advantages of the present invention are achieved by the illustrative embodiment of the present invention described hereinbelow.

In general terms, the constant magnification imaging system and method of the present invention provide for constant magnification through dynamic rescaling. Thus, in the system of the present invention, standard optics can be used to acquire the image and generate a constant magnification result. The constant magnification imaging system and method of the present invention perform asynchronous and real-time spatial up-sampling and amplitude quantizing for live operations that collect relatively high resolution amplitude data at the spatial and temporal capacity of the data collection device (herein referred to as relatively low characteristic scan resolution), but only process an amplitude quantized version of the data.

The method of present invention includes the step of choosing a target scan resolution. The method further includes the steps of receiving object dimensions and orientation, and building a dynamic focus profile to focus at least one camera based on the received object dimensions and orientation. The method also includes the steps of sampling, by the at least one camera, a signal source's reflected light amplitude at a relatively high resolution, and sampling, by the at least one camera, the signal source's surface area at a relatively low characteristic spatial/temporal frequency or scan resolution. The method further includes the steps of receiving the sampled relatively low characteristic scan resolution, relatively high resolution amplitude data as input data, and identifying a conventional rescaling algorithm and conventional quantizing algorithm, from a group of pre-selected algorithms, according to the received input data. The method further includes the step of applying a pre-determined focus-to-resolution curve to the dynamic focus profile and the target scan resolution, to create a dynamic resealing profile. The method further includes the steps of applying the rescaling algorithm to the combination of at least one rescaling factor from the dynamic rescaling profile and at least one line of the input data in real-time to create intermediate data of target scan resolution. The method further includes the step of applying the quantizing algorithm to the intermediate data in real-time to compute relatively low resolution amplitude output data of constant magnification at the target scan resolution. The target scan resolution, constant magnification, relatively low resolution amplitude output data are of substantially the same quality as if the signal source's amplitude were sampled at a relatively high resolution and a relatively high characteristic scan resolution, which is equivalent to the target scan resolution, using constant magnification optics, and then without changing the scan resolution, quantized into relatively low resolution amplitude output data.

For example, in a more specific application of the methodology of the present invention, the method of the illustrative embodiment includes the step of receiving dimensions of an object such as, for example, an upstream parcel as it travels down a transporting means such as, for example, a conveyor belt from an up-stream dimensioning device, and receiving a target scan resolution. The method further includes the step of uploading the dynamic focus profile to the at least one camera specific to the type of camera and its position with respect to the parcel. The method also includes the step of dynamically focusing the at least one conventional line scan camera by applying to the at least one line scan camera the dynamic focus profile. In what is known as open loop mode, the method still further includes the steps of creating at least one dynamic rescaling profile containing at least one rescaling factor derived from a pre-determined focus-to-resolution curve and target scan resolution, and uploading the at least one dynamic rescaling profile to a conventional programmable frame grabber device. The method also includes the step of selecting at least one appropriate conventional rescaling algorithm and at least one appropriate conventional quantizing algorithm and using them in the conventional programmable frame grabber. The method further includes the step of sampling the reflected light amplitude at a relatively high resolution, and the spatial frequency of the reflected light at a relatively low characteristic scan resolution, to produce gray image data of the parcel as it passes by the at least one camera. The method still further includes the steps of transferring the gray image data from the camera to the programmable frame grabber, and applying, in the programmable frame grabber in real-time, the conventional rescaling algorithm with the at least one rescaling factor, from the dynamic rescaling profile, to the relatively low characteristic scan resolution, relatively high resolution amplitude input data in real-time to create target scan resolution, relatively high resolution amplitude intermediate data, and applying the conventional amplitude quantizing algorithm to the intermediate data to create the target scan resolution, relatively low resolution amplitude output data.

The method of the present invention, in what is known as closed loop mode, differs from the open loop mode in that no dynamic rescaling profile is generated because the information required for dynamic rescaling is embedded in the image itself. In either open loop or closed loop mode, the camera requires focus information. In the closed loop mode, the focus information is imbedded in each image line that is sent to the frame grabber. The frame grabber uses the embedded focus data, the focus-to-resolution curve, and a target scan resolution to create at least one rescaling factor. The frame grabber applies the selected rescaling algorithm, with the at least one rescaling factor, to the image line to create a constant magnification image line of target scan resolution, which is then amplitude quantized using the selected quantization algorithm to relatively low resolution amplitude data.

In a general sense, the system of the present invention includes, but is not limited to, a data collection subsystem, an algorithm selection subsystem, and a data processing subsystem. More specifically, the system of the present invention includes a data collection device which may be part of the data collection subsystem. The data collection device is utilized for sampling a signal's amplitude at a relatively high resolution, but at a relatively low characteristic scan resolution. The relatively low characteristic scan resolution is based upon the spatial and temporal capacity of the data collection device. The data collection device has a characteristic scan resolution which, in the illustrative embodiment of the present invention, is, for example, relatively low in comparison to the target scan resolution of the resulting image.

The algorithm selection subsystem can choose an appropriate resealing algorithm and amplitude quantizing algorithm for an object that is being scanned and provide the resealing algorithm and the amplitude quantizing algorithm to the data processing subsystem. The algorithm selection subsystem establishes appropriate algorithms for processing the relatively low characteristic scan resolution, relatively high resolution amplitude input data in real-time.

The data processing subsystem executes, in real-time, the algorithms chosen by the algorithm selection subsystem to generate an amplitude quantized undistorted image of constant magnification and at the target scan resolution from relatively low characteristic scan resolution, relatively high resolution amplitude input data of a distorted image. The data processing subsystem is operably connected to the data collection subsystem and the algorithm selection subsystem. The data processing subsystem of the present invention builds a dynamic rescaling profile from external input means or pre-defined parameters including, for example, a pre-determined focus-to-resolution curve and a target scan resolution. The data processing subsystem executes the rescaling algorithm and the amplitude quantizing algorithm against the sampled input data and the dynamic rescaling profile such that the resulting image has an undistorted constant magnification. Further, the data processing subsystem is capable of executing algorithms as above in parallel with other on-going computer operations. In addition, the data processing subsystem is also capable of transferring the amplitude quantized image to a conventional CPU or another system for further processing.

In open loop mode, the purpose of the dynamic rescaling profile is to vary the magnification of the input data. The dynamic resealing profile contains factors for processing one or more lines of input data. In open loop mode, a rescaling factor from the dynamic rescaling profile is used by the data processing subsystem to apply to a certain line of input data based on the distance of the data collection device from the signal source (the focus value), and on the target scan resolution. The resulting rescaling factors are independent horizontal and vertical ratios that are applied to each line of input data. In closed loop mode, the dynamic rescaling that results in constant magnification is accomplished by deriving the rescaling factors from the focus information, passed from the data collection subsystem to the data processing subsystem within the input data itself, along with the focus-to-resolution curve and the target scan resolution, as is done in open loop mode.

The system of the present invention can further include a first storage location and a second storage location, both operably connected to the data processing system. The first and second storage locations can be one in the same, and both can be computer memory, computer mass storage, or computer networked storage. The data processing subsystem is capable of storing in real time, in the first storage location, intermediate data that result from the application of the selected rescaling algorithm. Further, the data processing subsystem is capable of storing in real time, in the second storage location, the output data that result from the application of the selected amplitude quantizing algorithm.

For a better understanding of the present invention, reference is made to the accompanying drawings and detailed description. The scope of the present invention is pointed out in the appended claims.

DETAILED DESCRIPTION OF THE INVENTION

The present invention is now described more fully hereinafter with reference to the accompanying drawings, in which the illustrative embodiment of the present invention is shown.

Figure 1:
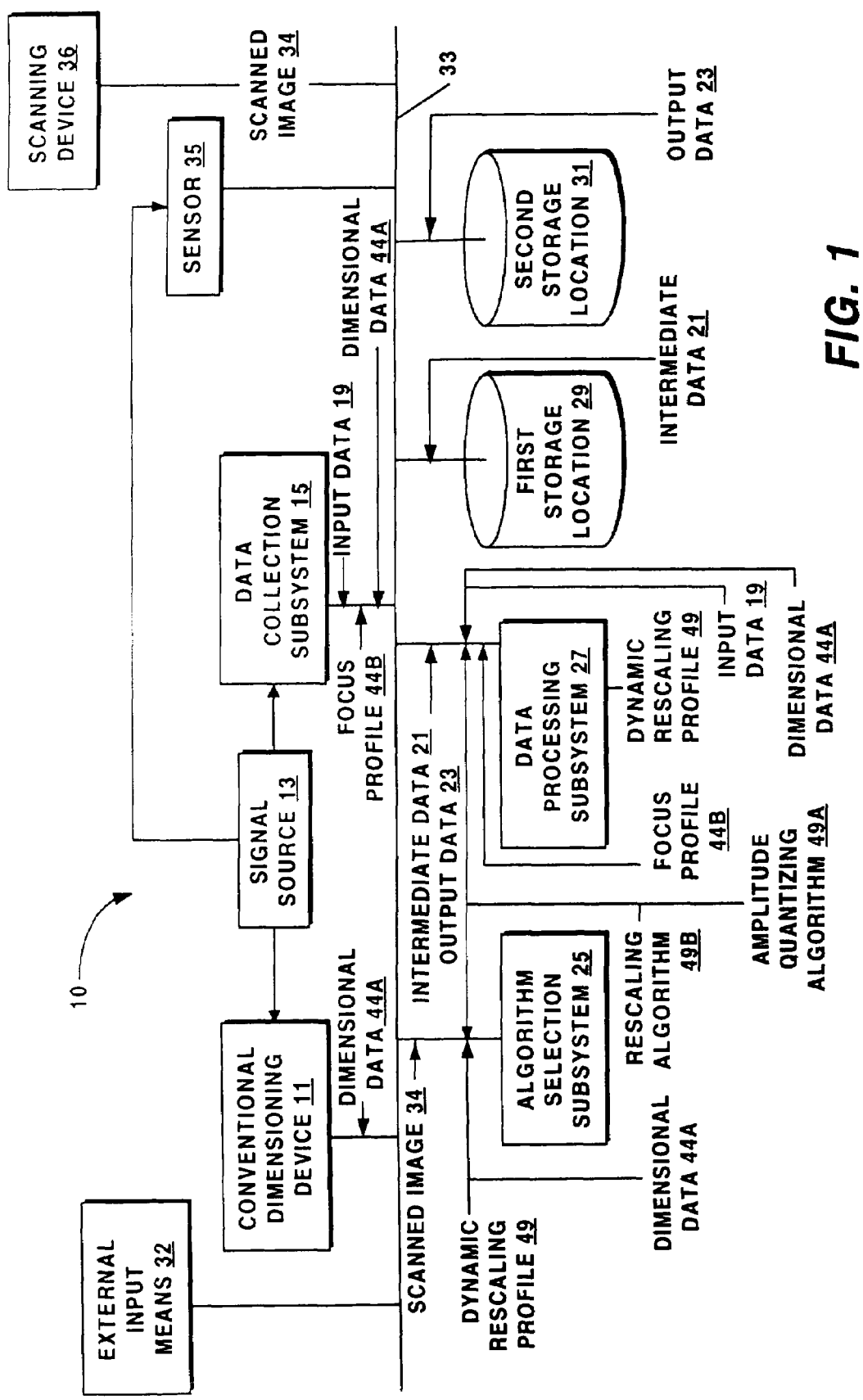
FIG. 1 is a schematic block diagram of the constant magnification system of the present invention.
Figure 2A:
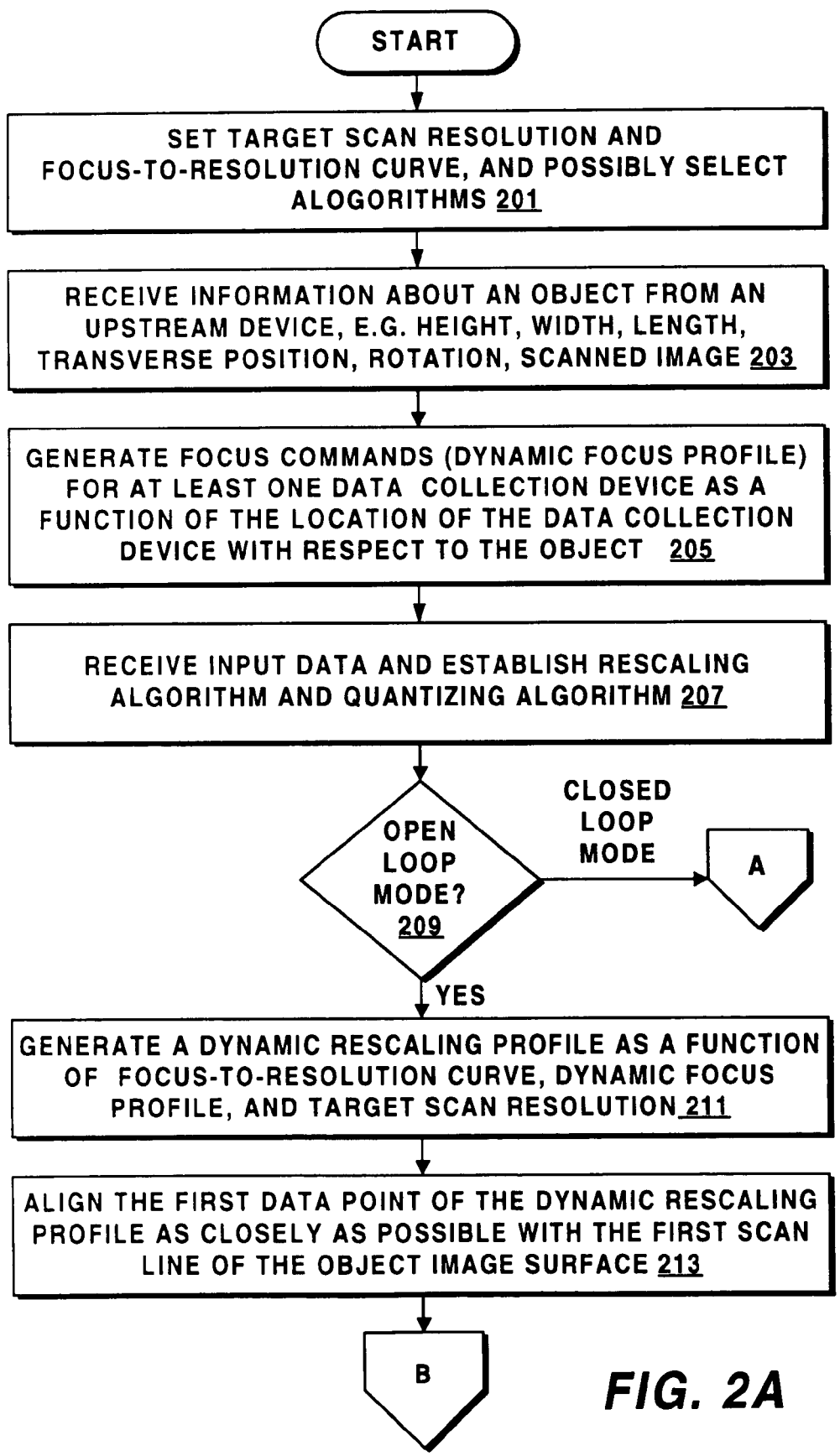
FIGS. 2A-C are flowcharts of the method of the illustrative embodiment of the present invention.
Figure 2B:
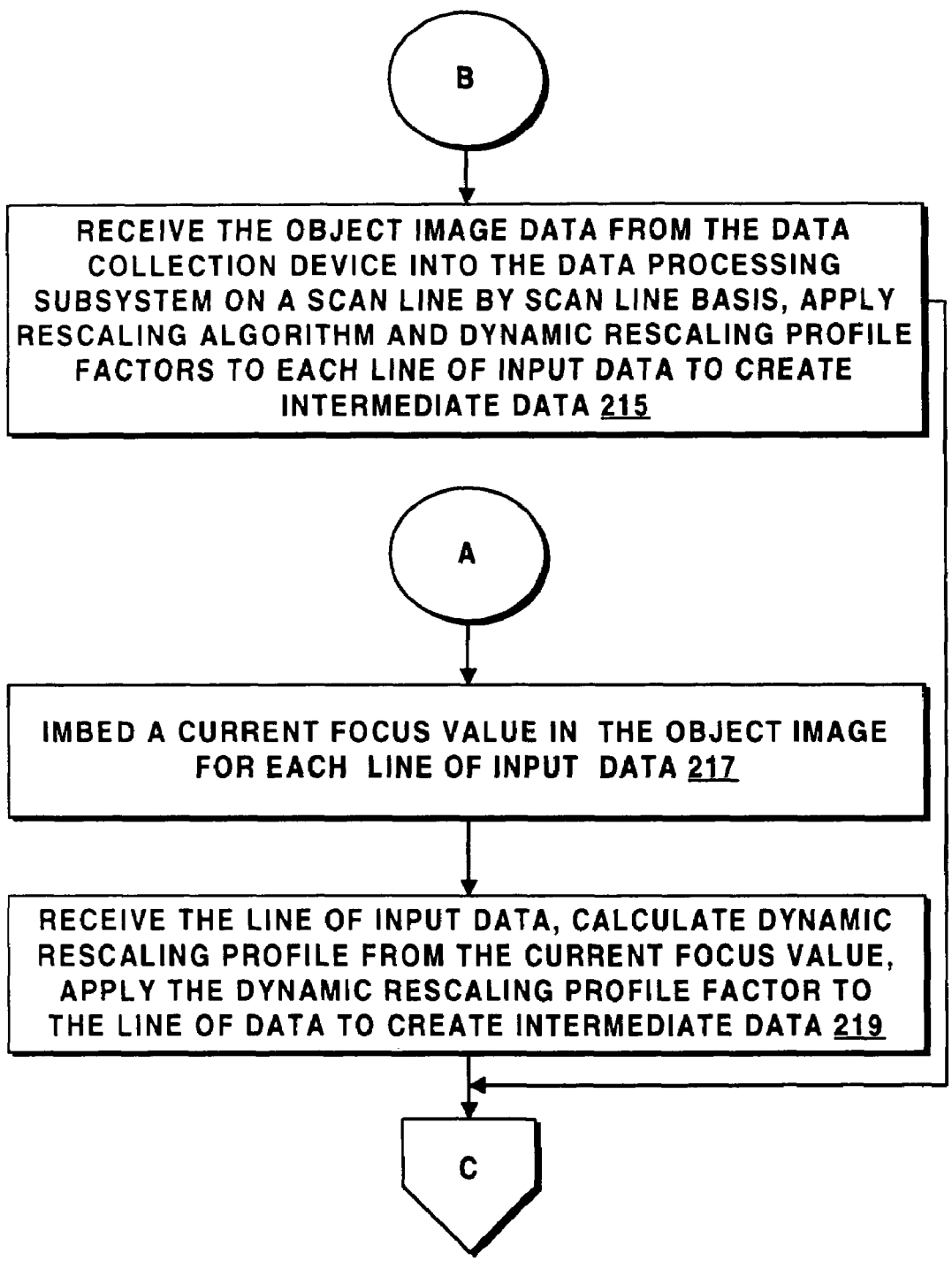
Figure 2C:
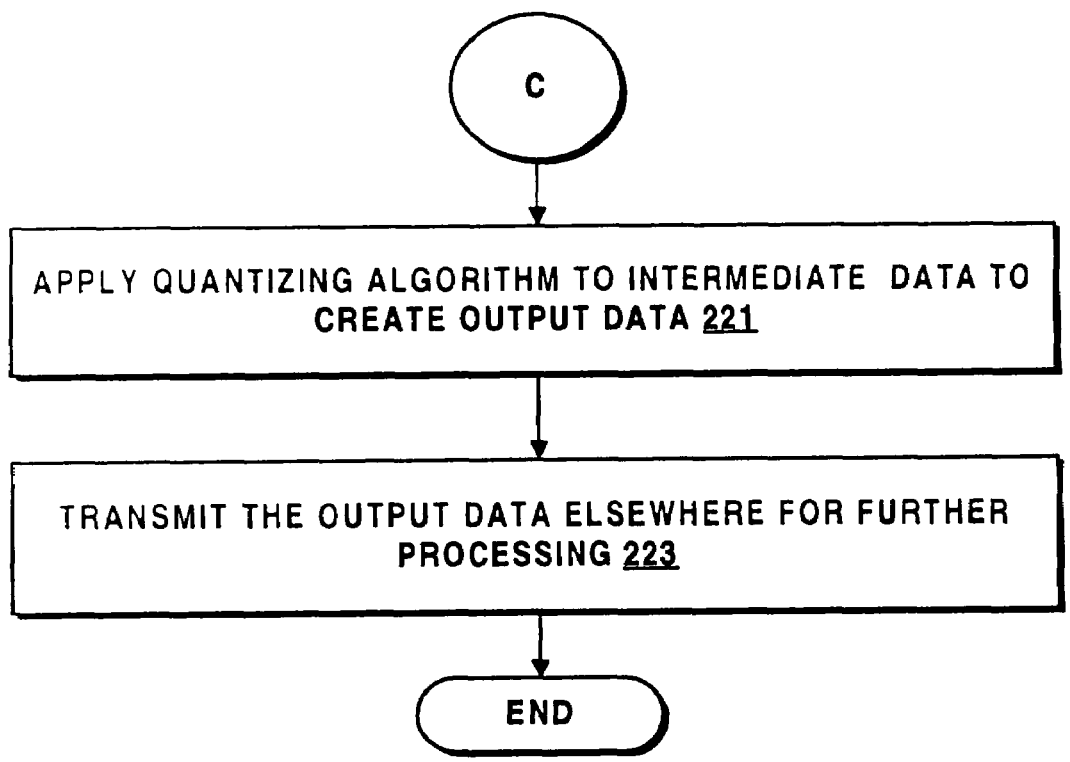

The components of system 10 of the present invention are schematically shown in FIG. 1. A schematic, illustrative embodiment of the present invention is also presented in the description accompanying FIG. 3. A practical application of the present invention is shown in FIG. 4. Referring now primarily to FIG. 1, system 10 generally includes a signal source 13, a data collection subsystem 15, an algorithm selection subsystem 25, a data processing subsystem 27, a scanning device 36, and an external input means 32. Scanning device 36 scans an object (such as parcel 61, FIG. 4) and sends scanned image 34 to algorithm selection subsystem 25 for classification of the object. The algorithm selection subsystem 25 classifies the image (see FIG. 5) and sends the appropriate rescaling algorithm 49B and amplitude quantizing algorithm 49A to the data processing subsystem 27. Conventional dimensioning device 11 provides dimensional data 44A to data processing subsystem 27. Data collection subsystem 15 receives dimensional data 44A either directly from conventional dimensioning device 11 or as dynamic focus profile 44B through data processing subsystem 27. No matter how dimensional data 44A are provided to the data collection subsystem 15, the data are used to set up the data collection subsystem 15 to properly focus on the signal source 13. The data collection subsystem 15 samples reflected light amplitude of signal source 13 at a relatively high resolution and samples the surface area of signal source 13 at a relatively low characteristic scan resolution after signal source 13 passes triggering sensor 35 which triggers data collection subsystem 15 to begin sampling. The data collection subsystem 15 transmits in real-time, through operable connection 33, the relatively low characteristic scan resolution, relatively high resolution amplitude input data 19 on a line-by-line basis to data processing subsystem 27. While the data collection subsystem 15 is designed for real-time operation, batch processing is not precluded by this invention. Operable connection 33 can include, but isn't limited to, any or all of the following: a data bus, an internet connection, a local area network connection, an ANSI/TIA/EIA-644 interface, a Cameralink™ specification compliant physical interface, or any other type of electrical connection that allows the transmission of electronic image data.

Continuing to refer to FIG. 1, algorithm selection subsystem 25 can use scanned image 34 from scanning device 36 to select a rescaling algorithm 49B automatically, or the rescaling algorithm 49B could also be selected manually or by default. Algorithm selection subsystem 25 provides rescaling algorithm 49B to data processing subsystem 27. Algorithm selection subsystem 25 also allows the selection of at least one amplitude quantizing algorithm 49A, either manually, by default, or automatically. The dimensional data 44A, a target scan resolution, and a focus-to-resolution curve are processed to generate a dynamic rescaling profile 49. The target scan resolution and the focus-to-resolution curve can be provided by, for example, external input means 32 or can be pre-defined. The data processing subsystem 27 receives relatively low characteristic scan resolution, relatively high resolution amplitude input data 19 from the data collection subsystem 15 and, in open loop mode, executes the rescaling algorithm 49B, with rescaling factors from the dynamic rescaling profile 49, to each line of input data 19 to convert the relatively low characteristic scan resolution, relatively high resolution amplitude, distorted, input data 19 to a line at the target scan resolution which is undistorted constant magnification relatively high resolution amplitude data (intermediate data 21). The line of intermediate data 21 may be stored for possible use by other systems in a first storage location 29. In closed loop mode, data processing subsystem 27 derives the resealing factors from information located within the input data 19 itself and executes those factors against input data 19 as above. Continuing to refer to FIG. 1, the data processing subsystem 27 also executes for each line of intermediate data 21 the selected amplitude quantizing algorithm 49A to convert the target scan resolution, relatively high resolution amplitude data to target scan resolution, relatively low resolution amplitude data (output data 23). These data may also be stored for possible use by other systems in a second storage location 31.

For a better understanding of the present invention, including its methodology set forth in a series of steps provided below, reference is now made to FIGS. 1 and 2A-C. The method of the present invention includes the step of setting a target scan resolution, a focus-to-resolution curve, and possibly manually selecting a rescaling algorithm 49B (FIG. 1) and an amplitude quantizing algorithm 49A (FIG. 1), possibly by external input means 32 (FIG. 1) (method step 201). The method can further include the step of receiving, from an upstream conventional dimensioning device 11 (FIG. 1) and possibly a scanning device 36 (FIG. 1), information about an object including, but not limited to, height, width, length, transverse position, rotation, and a scanned image 34 (FIG. 1) (method step 203). The method also includes the step of generating focus commands (focus profile 44B (FIG. 1)) for at least one data collection device from the information about the object, the focus commands depending on the location of the at least one data collection device with respect to the object (method step 205). The method further includes the steps of receiving input data and establishing resealing algorithm 49B and amplitude quantizing algorithm 49A (method step 207). In open loop mode (decision step 209), the method further includes the steps of generating a dynamic rescaling profile 49 (FIG. 1) for the incoming object image from parameters, such as, for example, the focus-to-resolution curve, focus profile 44B, and the target scan resolution (method step 211). The method further includes the step of aligning the first data point of the dynamic rescaling profile 49 as closely as possible with the first scan line of the surface of the object within the scanned image (method step 213). The method still further includes the steps of applying rescaling algorithm 49B and at least one rescaling factor from dynamic rescaling profile 49 to at least one line of input data 19 (FIG. 1) to create intermediate data 21 (FIG. 1) (method step 215). In closed loop mode (decision step 209), the method includes the step of embedding the current focus value in the object image data, such as, for example, in the first pixel, for each line of input data 19 (method step 217). The method still further includes the steps of receiving the line of input data 19, determining a dynamic rescaling profile factor from the current focus value, and applying the dynamic resealing profile factor to that line of input data 19 to create intermediate data 21 (method step 219). For either mode, the method further includes the step of applying amplitude quantizing algorithm 49A to each line of intermediate data 21 to create output data 23 (FIG. 1) (method step 221). The method further includes the step of transmitting each line of output data 23 elsewhere for further processing (method step 223) and exiting. Note that lines of input data can be processed individually, or groups of lines or the whole image can be processed in batch mode.

The method of the present invention can be, in whole or in part, implemented electronically by the system as described above with respect to FIG. 1. Signals representing actions taken by elements of the system can travel over electronic communications media. Control and data digital information can be electronically executed and stored on computer-readable media. Common forms of computer-readable media include, for example, a floppy disk, a flexible disk, a hard disk, magnetic tape, or any other magnetic medium, a CDROM or any other optical medium, punched cards, paper tape, or any other physical medium with patterns of holes, a RAM, a PROM, and EPROM, a FLASH-EPROM, or any other memory chip or cartridge, a carrier wave, or any other medium from which a computer can read.

Figure 3:
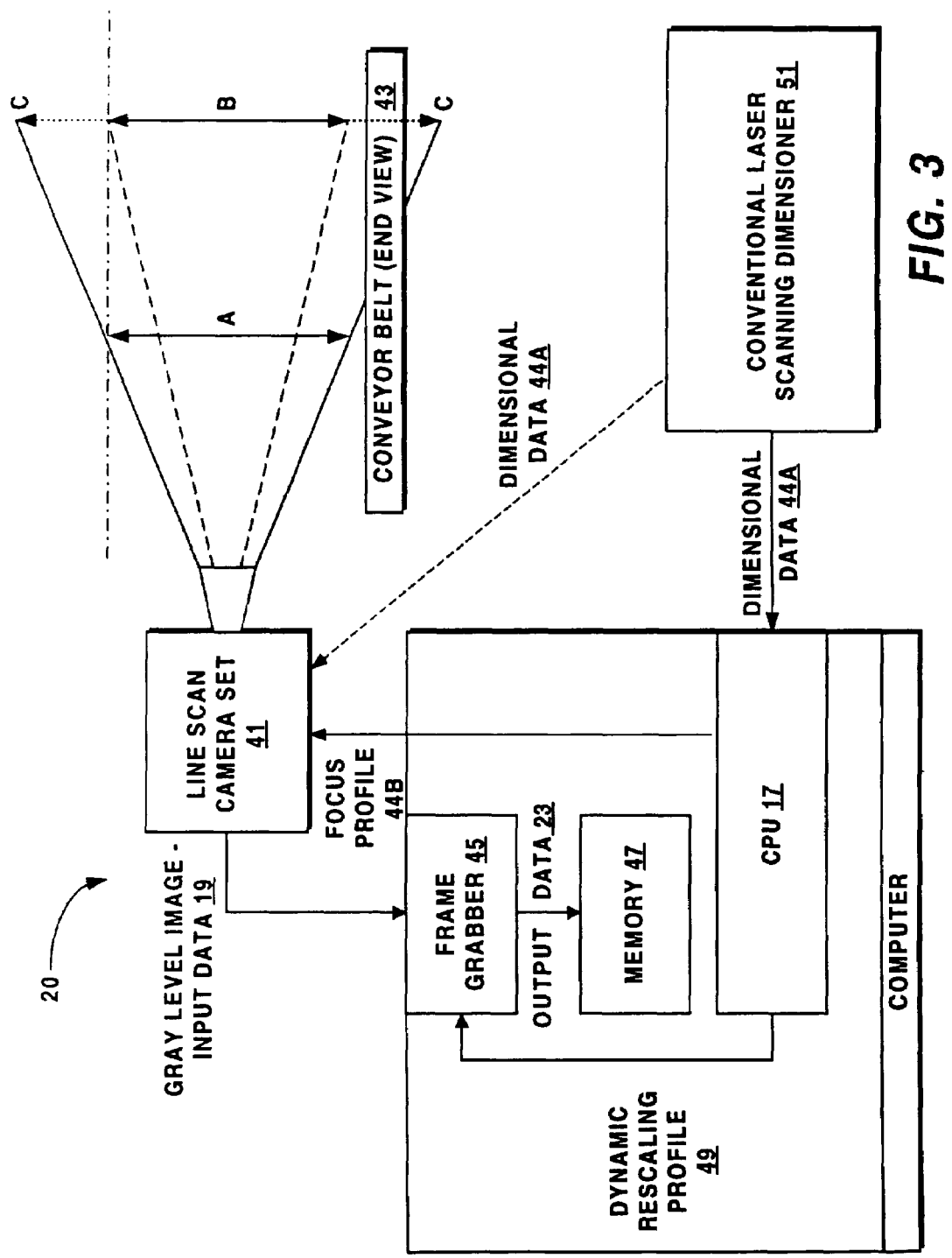
FIG. 3 is a schematic representation of the illustrative embodiment of the present invention.
Figure 4:
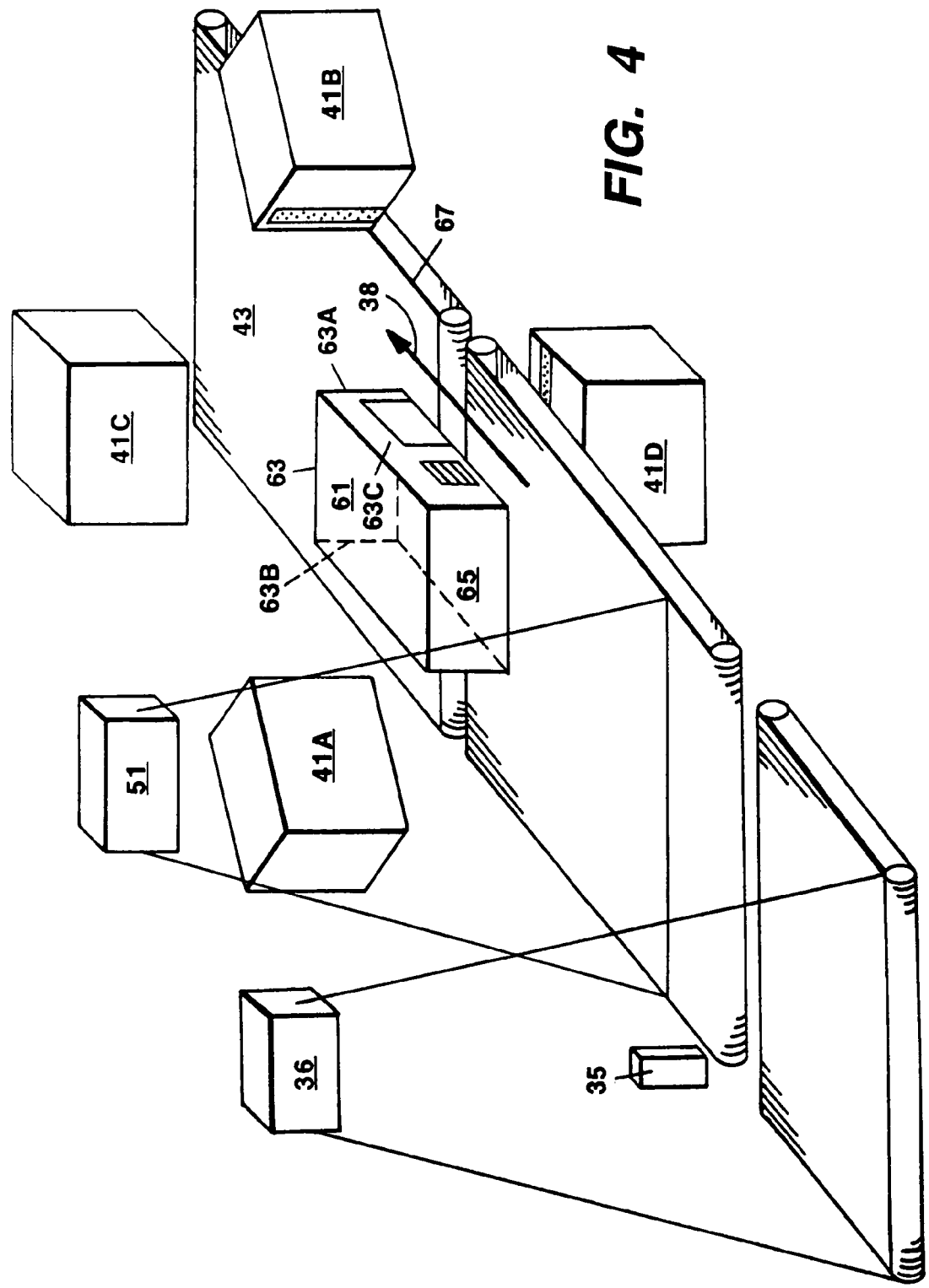
FIG. 4 is a schematic, pictorial representation of some of the components of the present invention, illustrating an object being transported on a conveying or moving system, past dimensioners and line scan cameras, which may be utilized with the present invention.

Whereas FIG. 1 describes a general case of the present invention, system 20, shown in FIG. 3, presents an illustrative embodiment of the present invention, wherein like components are referenced by similar reference numbers in both the general case of FIG. 1 and the illustrative embodiment of FIG. 3. System 20 generally includes a line scan camera set 41 (a specific instance of data collection subsystem 15 (FIG. 1)) including one or more conventional line scan cameras. System 20 further includes a conventional frame grabber 45 and a conventional computer CPU 17 with computer memory 47, collectively providing an instance of data processing subsystem 27 (FIG. 1). System 20 still further includes conventional laser scanning dimensioner 51 (a specific instance of conventional dimensioning device 11 (FIG. 1)) that measures parcel dimensions and orientation, such as, for example the Accu-Sort™ DM-3000 which is an overhead dimensioning unit that automatically measures the length, width, and height of packages as they move along a conveyor.

Continuing to refer to FIG. 3, Lines "A" and "B" indicate the perspective of the line scan camera set 41 as it views an object across conveyor belt 43. Since line "A" takes up the full field of view, the image appears larger at Line "A" than the image at line "B", that takes up a much smaller portion of the field of view, even though the object, or more specifically the parcel, has not changed in size. The system and method of the present invention resize the image at line "B" based upon the relative distance of the parcel from the camera lens. Thus, both line "A" and line "B" (which has been enlarged to the size of line "C") are the same size in the resulting image.

Continuing to refer to FIG. 3, in operation, dimensional data 44A such as, for example, height, width, length, transverse position, and rotation, are received into conventional CPU 17 from conventional laser scanning dimensioner 51. The conventional CPU 17 could then generate and send dynamic focus profile 44B to line scan camera set 41 to allow dynamic focusing of the surface as it goes by line scan camera set 41. Dynamic focusing within the present invention can be accomplished in others ways. For example, but not limited thereto, line scan camera set 41 could receive dimensional data 44A in a streaming fashion and adjust the focus as the data are received. The invention is not limited to either configuration. For example, conventional laser scan dimensioner 51 can either transmit dimensional data 44A to either CPU 17 (in open or closed loop mode), or line scan camera set 41 (in closed loop mode only), or both (in open or closed loop mode). Line scan camera set 41 can either use the dynamic focus profile 44B, from CPU 17, and/or can use dimensional data 44A. Dynamic focus profile 44B is created for each camera in camera set 41. The dynamic focus profile 44B for the particular camera in camera set 41 is sent to that camera to enable the camera to ensure that the image of the parcel surface is in sharp focus as it tracks where the surface is in relation to the camera's lens. Clearly the contents of dynamic focus profile 44B for each camera depend on the position of the camera with respect to the parcel to be scanned. In "open loop" mode, dimensional data 44A are also used to create a dynamic rescaling profile 49, a table of rescaling factors. The conventional CPU 17 loads dynamic rescaling profile 49 into frame grabber 45, where resealing of the image on a line-by-line basis in real-time takes place, creating intermediate data 21 (FIG. 1). Following this procedure, the selected amplitude quantizing algorithm 49A (FIG. 1) is executed against each line of intermediate data 21. The resulting output data 23 (FIG. 1) can be stored in any convenient location, including but not limited to conventional memory 47, networked memory, or mass storage.

Reference is now made to FIG. 4 for a description of examples of practical applications of the present invention. A typical object such as parcel 61 is scanned on all six sides by four line scan cameras 41A-D as parcel 61 passes by cameras 41A-D on conveyor belt 43. Note that the first and second side cameras, 41A and 41B respectively, can be, but aren't limited to being, oriented at 45° with respect to the conveyor belt, which allows the cameras 41A and 41B to scan both one side of parcel 61 and either the leading side 63 or trailing side 65 of parcel 61. For the desired results, parcel 61 is substantially aligned with respect to the edge 67 of the conveyer belt 43 (within +/−20°). Such alignment prevents the angle of incidence from becoming too steep to acquire a usable image.

Figure 5:
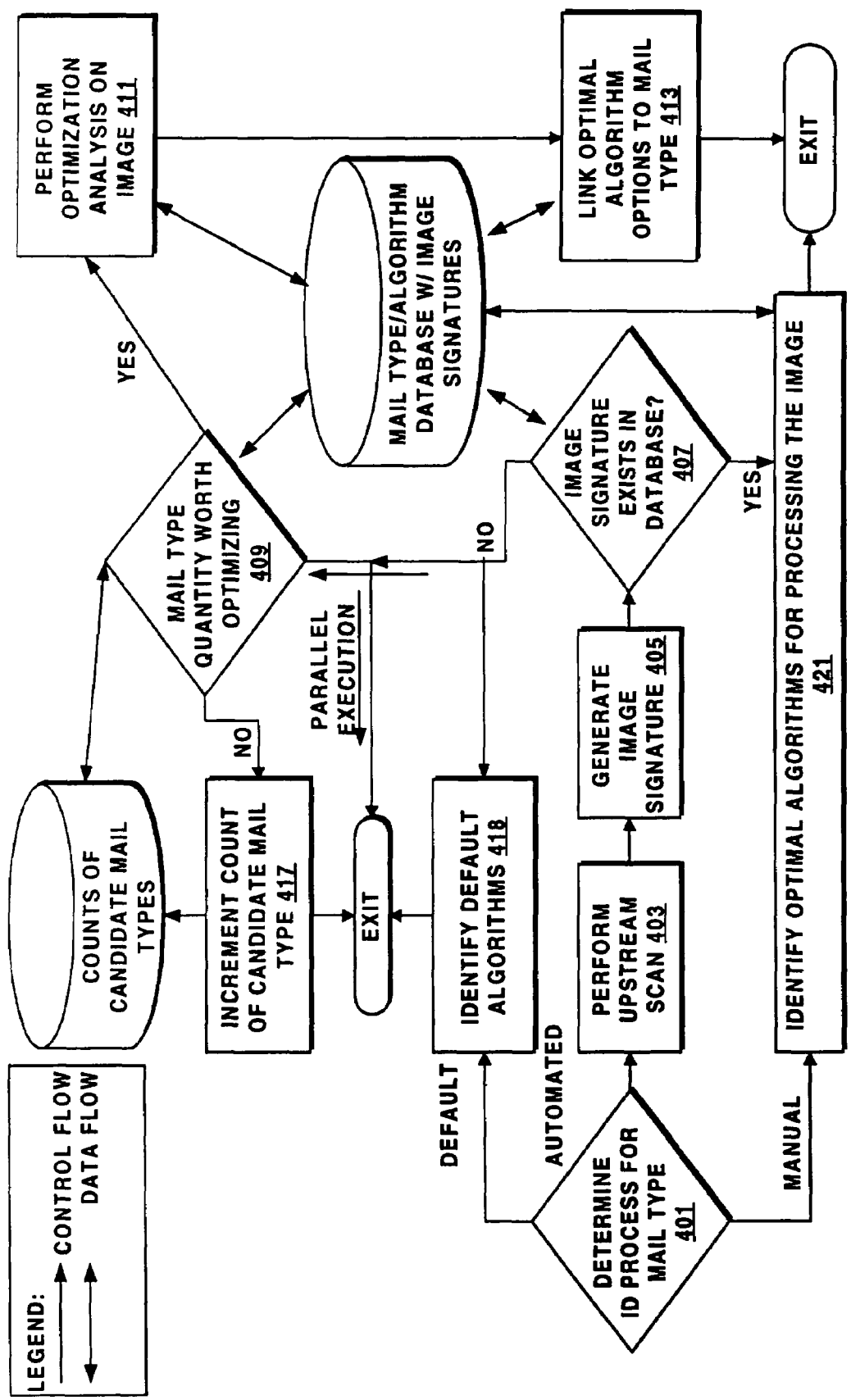
FIG. 5 is a control and data flow schematic diagram of the algorithm selection system of the illustrative embodiment of the present invention.

Still referring to FIGS. 1, 3, and 4, after being notified of an upstream parcel 61 (FIG. 4) by sensor 35 (FIGS. 1, 4), conventional laser scanning dimensioner 51 (FIGS. 3, 4) supplies position, size and orientation data of parcel 61 through computer CPU 17 (FIG. 3) to the line scan cameras 41A-D (FIG. 4). Optionally, scanning device 36 (FIG. 4) can supply scanned image 34 (FIG. 1) to algorithm selection subsystem 25 (FIG. 1) to facilitate automated algorithm selection as depicted in FIG. 5. CPU 17 sends to line scan camera 41C a message, such as, to "focus to the height of the parcel". CPU 17 sends to cameras 41A and B the dynamic focus profile 44B (FIG. 3) that defines the corners of parcel 61 as viewed from above. From the corner coordinates of parcel 61, the focus profile can be determined by the camera. In the illustrative embodiment, line scan camera 41D is a constant focus camera, since parcel 61 sits upon conveyor belt 43 surface and does not change in distance from line scan camera 41D lens, and thus dynamic rescaling profile 49 for camera 41D is constant and data from line scan camera 41D are rescaled by a constant value. CPU 17 can supply dynamic focus profile 44B to line scan cameras 41A, B, and C, and thus resealing factors can be chosen either as a function of the focus profile data in open loop mode or from the embedded data received from line scan cameras 41A, B, and C in closed loop mode (see FIGS. 2A-C).

Continuing to refer to FIGS. 1, 3, and 4, in the system of the present invention, in open loop mode, CPU 17 (FIG. 3) provides frame grabber 45 (FIG. 3) with dynamic rescaling profile 49 (FIG. 3). Dynamic rescaling profile 49, containing, for example, rescaling factors, varies according to the part of the parcel 61 that is being viewed. For example, when parcel 61, aligned as shown in FIG. 4, traveling in direction of travel 38, comes into view of line scan camera 41B (FIG. 4), the front of parcel 61, leading side 63 (FIG. 4), is scanned. This scanning results in an image of trapezoidal shape with the furthest edge 63B (FIG. 4) from line scan camera 41B appearing smaller than the closest edge 63A (FIG. 4) to line scan camera 41B. If a constant rescaling factor is applied to the image, as in prior systems, the resolution is improved, but the trapezoidal distortion remains. However, using dynamic rescaling profile 49 not only improves the resolution of the resulting image, but also removes the trapezoidal distortion by applying gradient up-sampling factors on a line-by-line basis, which magnify the elements from the furthest edge 63B to the closest edge 63A of the image to match the size of the elements of closest edge 63A within the resulting image. Camera 41A performs a similar operation on trailing side 65 (FIG. 4). The final images of leading side 63 and trailing side 65 are rectangular in shape, as if they had been scanned at a constant distance from the lens of cameras 41B, in the way that the right side 63C of the parcel is imaged.

Continuing to refer to FIGS. 1, 3, and 4, the system of the present invention can be operated in either a closed loop or open loop manner. In open loop mode, frame grabber 45 receives a copy of dynamic rescaling profile 49 (FIG. 3) specific for line scan cameras 41A-D and applies the rescaling factors from dynamic rescaling profile 49 accordingly. The software executing in CPU 17 (FIG. 3) generates or builds a dynamic rescaling profile 49 (FIG. 3) based on the combination of the dynamic focus profile 44B, the focus-to-resolution curve, and the target scan resolution.

In closed loop mode, line scan cameras 41A-D can receive dynamic focus profile 44B from CPU 17 or directly from dimensioner 51. Line scan cameras 41A-D (FIG. 4) can then embed their focus information within lines of input data 19 (FIG. 1) and transmit focus information and input data 19 to frame grabber 45 (FIG. 3), or focus information can be transmitted any other way. This information can include the distance between the line scan cameras 41A-D and the object upon which they focus, and can include the angle of incidence from line scan cameras 41A-D to the object. In the illustrative embodiment of the present invention, the first two pixels of each line of input data contain focus and angle information, however there is no limitation on the positioning of this information, nor the content of the information.

Continuing to refer to FIG. 4, in the illustrative embodiment of the present invention, the digital line-scan cameras 41A-D can each be, but are not limited to, Accu-sort® model AV3800. This type of digital line-scan camera includes a high speed transmission device that allows data rates on two channels up to forty Megabytes/second/channel. Although the illustrative embodiment includes such a camera, the invention isn't limited to a particular number of channels, a particular data rate, or a particular camera. Conventional programmable frame grabber 45 (FIG. 3) may be a model Accu-sort® Acculink frame grabber (under development by Accu-sort®), but is not limited to this make and model of frame grabber. The conventional programmable frame grabber 45 has the capability of receiving data such as those generated by digital line scan cameras 41A-D, but in general any combination of digital or analog camera and compatible programmable frame grabber of similar or higher capability or other coupled devices can be used to perform the processing specified herein. The particular camera/frame grabber combination is described herein for illustrative purposes only.

The system of the present invention could be used to rescale the supplied image in any way, including reduction and enlargement of the image, to any desired magnification. The system of the present invention allows for imaging distortion-free front and trailing surfaces of objects without special optics. In addition an object such as a parcel can be situated anywhere across the width of the belt, and the system of the present invention can accommodate larger objects than systems of the prior art.

Referring again to FIGS. 1, 3, and 4, for each line of input data 19 (FIGS. 1, 3), after the algorithm selection subsystem 25 (FIG. 1) (described below) allows the selection of suitable algorithms for the particular image, data processing subsystem 27 (FIG. 1), including software that is either uploaded (e.g. the algorithms) or resident—executing in frame grabber 45 (FIG. 3) and software executing in computer CPU 17 (FIG. 3) in the illustrative embodiment—continues processing as follows. In the illustrative embodiment, data processing subsystem 27 can upload all selected algorithms that can later be identified by the algorithm selection subsystem 25 at initialization into frame grabber 45 by commercial utilities provided with the conventional frame grabber product. The present invention is not limited to a particular method of loading the algorithms into frame grabber 45, i.e. the algorithms do not have to be loaded at initialization, but can be dynamically loaded during object processing. As an object is dimensioned, data processing subsystem 27 receives an identification number for the object, and receives dimensional data 44A (FIGS. 1 and 3), such as parcel dimension and orientation, about the object from conventional laser scanning dimensioner 51 (FIGS. 3 and 4). Dimensional data 44A (FIG. 1) is used by data processing subsystem 27 to generate dynamic focus profile 44B (FIGS. 1 and 3), which is sent to cameras 41A-D. Focus profile 44B enables cameras 41A-D to maintain a sharp optical image of the surface as it passes through the scan lines of cameras 41A-D. In open loop mode, dimensional data 44A can also be used by data processing subsystem 27 to generate dynamic rescaling profile 49 (FIGS. 1 and 3), which is sent to the frame grabber 45 and applied to the image on a line-by-line basis as the camera scans the parcel surface. In closed loop mode, cameras 41A-D embed a focus value so that frame grabber 45 can determine a rescaling factor for each scan line by reading the embedded focus value of that scan line and using a lookup table, that is generated from the focus-to-resolution curve and the target scan resolution, that can be loaded at initialization or at any other time, or computed dynamically. Intermediate data 21, which can be saved in first storage location 29, results from the execution of rescaling algorithm 49B on input data 19 and the associated rescaling factor for that line of input data 19. Output data 23—which can be stored in second storage location 31 or can be electronically transmitted elsewhere over electronic interface 33 (FIG. 1)—results from the application of amplitude quantizing algorithm 49A to intermediate data 21. Local processing can continue on in parallel in CPU 17 (FIGS. 1 and 3) while intermediate data 21 and output data 23 are being computed in frame grabber 45.

Referring now to FIG. 5, for each image that is produced by scanning an object using the line scan camera 41, for example a mail parcel, the illustrative flow of the algorithm selection system 25 (FIG. 1) is shown. The method of the illustrative embodiment of the present invention includes a first step of determining an identification process for a mail type, that is, a characterization of an object that is being scanned by such as, for example, scanning device 36 (FIGS. 1 and 4) (decision step 401). If the identification process is "default", the method includes the step of identifying default algorithms (amplitude quantizing algorithm 49A (FIG. 1) and rescaling algorithm 49B (FIG. 1)) to use for processing the image of the object and exiting (method step 418). If the identification process is manual, the method includes the step of identifying, possibly through an external input means, optimal algorithms for processing the image (method step 421) and exiting. In this step, for example, a user could be prompted for the type of object to be processed, or the user could be prompted for the actual algorithms to be used. If the identification process is automated, the method includes the steps of performing an upstream scan (such as, for example, by scanning device 36)

of the object, for example a mail parcel, being imaged (method step 403) and generating an image signature in order to determine the mail type (method step 405). The method further includes the step of determining if the image signature exists in an image signature database (decision step 407). If the image signature exists in the database, the method further includes the step of retrieving from the database of mail type/algorithms the optimal algorithms for processing the image (method step 421) and exiting. If the image signature does not exist in the database, the method of the illustrative embodiment includes further parallel steps of identifying default algorithms (method step 418) and exiting, as well as determining if the quantity of images, which have signatures that are similar enough to be grouped as a unique mail type, is sufficient such that a mail type should be created, optimized, and stored in the database (decision step 409). If there are currently not enough images of that particular mail type to warrant optimization, the method further includes the steps of incrementing and storing a count of the candidate mail type (method step 417) and exiting. If there are enough images of that particular type to warrant optimization (decision step 409), the method includes the further steps of performing an optimization analysis on this type of image (method step 411), linking optimal algorithm options to the mail type/algorithm database, storing the mail type in association with an image signature and optimal algorithms (method step 413), and exiting.

Possible rescaling algorithms 49B (FIG. 1) can include, but are not limited to, linear, nearest-neighbor, Lagrange- and Gaussian-based interpolators, Blackman-Harris windowed-sinc kernels, quadratic and cubic convolution, and cubic B-spline. Descriptions of these techniques are given in *A Chronology of Interpolation: From Ancient Astronomy to Modern Signal and Image Processing*, Meijering, E., *Proceedings of the IEEE*, Vol. 90. No. 3. March 2002, pp. 319-341, incorporated in its entirety herein by reference.

Possible amplitude quantizing algorithms 49A (FIG. 1) can include, but are not limited to, locally adaptive algorithms described in *Goal-Directed Evaluation of Binarization Methods*, Trier, O. D. and Jain, A. K., citeseer.nj.nec.com/trier95goaldirected.html, 1995, pp. 47-58, incorporated in its entirety herein by reference, such as Yankowitz/Bruckstein and White/Rohrer, globally adaptive algorithms such as Otsu, and modified locally adaptive algorithms such as Niblack and Eikvil/Taxt/Moen. Other algorithms are outlined in *Evaluation of Binarization Methods for Document Images*, Trier, O. D. and Taxt, T., *IEEE Transaction on Pattern Analysis and Machine Intelligence*, 17, pp. 312-315, 1995, incorporated in its entirety herein by reference.

Figure 6A:
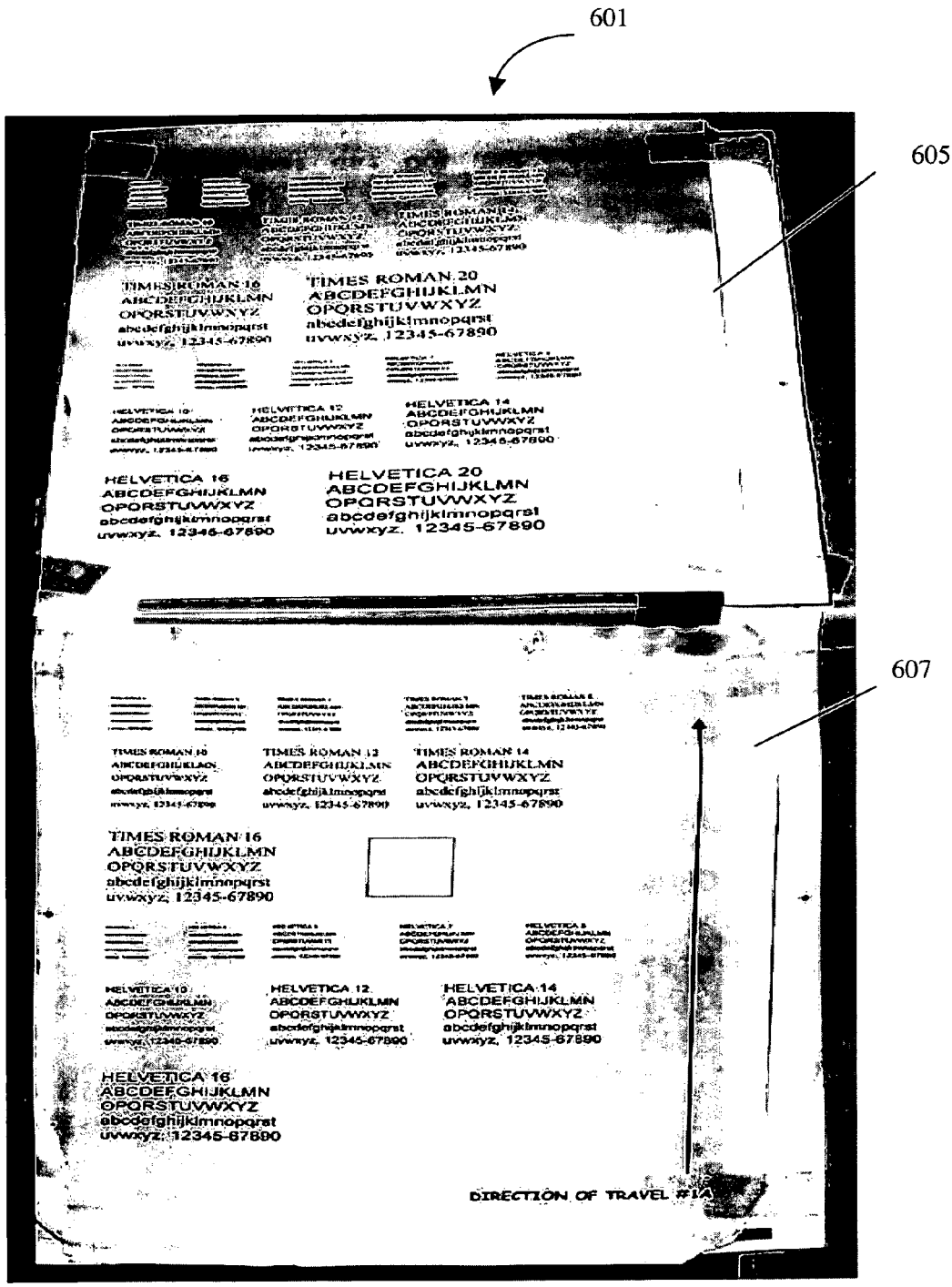
FIGS. 6A and 6B are photographic representations of the prior art and the result of applying the method of the illustrative embodiment of the present invention to printed sheets mounted on the front and on one side of an object aligned parallel to the direction of travel as the object travels through the system of the present invention.
Figure 6B:
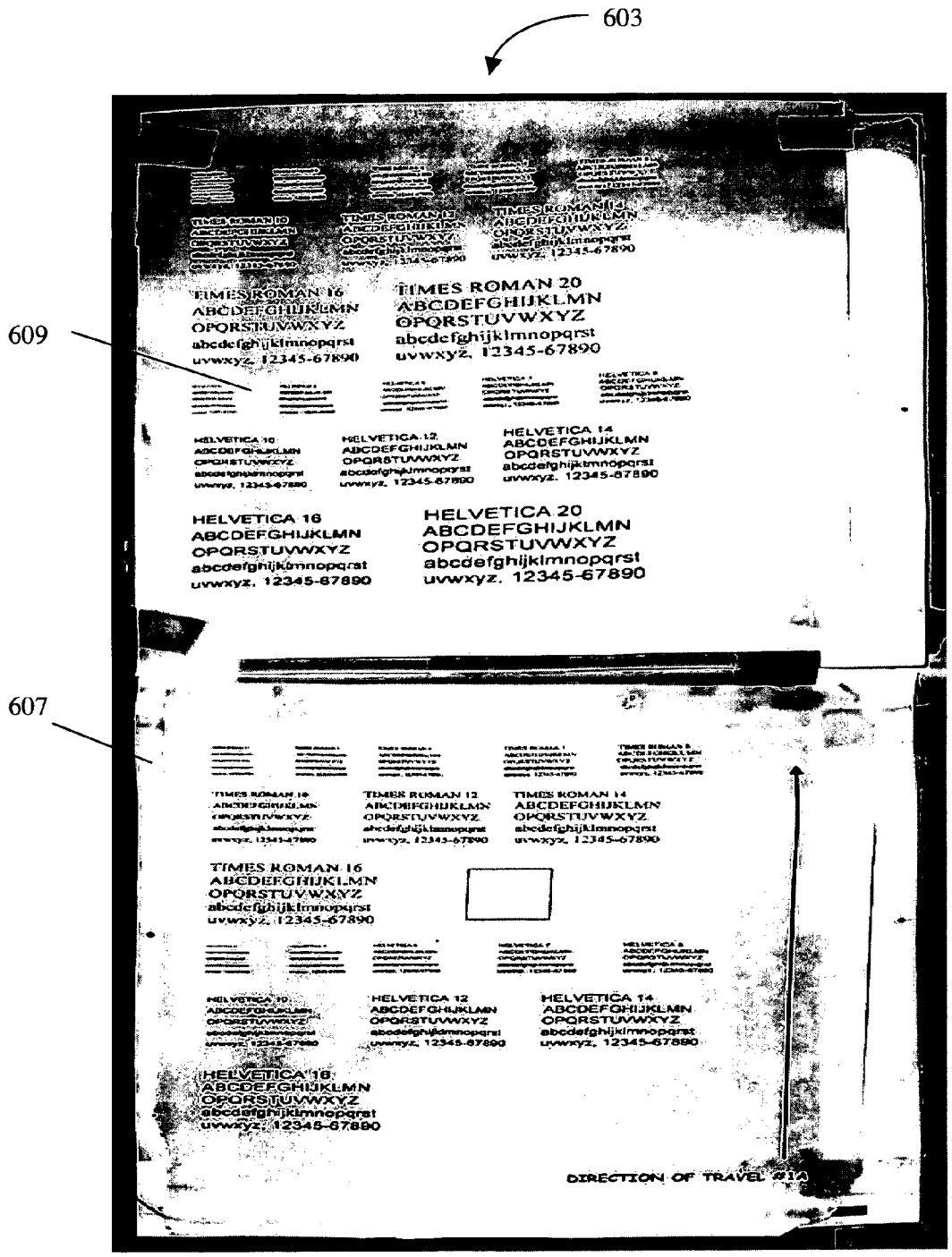

In order to visualize the result of operating the system of the present invention, reference is now made to FIGS. 6A and 6B, which are images taken of a substantially aligned box that has been imaged by a system of the prior art (FIG. 6A) and the system of the present invention (FIG. 6B). Referring now to FIG. 6A, trapezoidal image 601 shows a front surface 605 and side surface 607 of an object rescaled with a constant factor according to system of the prior art. Note the trapezoidal distortion of front surface 605 as compared with side surface 607. Referring now to FIG. 6B, constant magnification image 603 illustrates how the application of the constant magnification imaging system and method of the present invention eliminate the trapezoidal distortion of corrected front surface 609 and present an image very similar to the aligned side surface 607, which is much easier to process.

Although the invention has been described with respect to various embodiments, it should be realized this invention is also capable of a wide variety of further and other embodiments within the spirit and scope of the appended claims.

What is claimed is:

1. A constant magnification imaging method comprising the steps of:
    sampling reflected light amplitude of a signal source at a relatively high resolution while sampling surface area of the signal source at a relatively low characteristic spatial/temporal frequency (scan resolution) to produce input data; and
    applying a pre-selected rescaling algorithm and a pre-selected amplitude quantizing algorithm to the input data in real-time to create target scan resolution, relatively low resolution amplitude output data of constant magnification.

2. The constant magnification imaging method as in claim 1 further comprising the steps of:
    establishing the pre-selected resealing algorithm; and
    establishing the pre-selected amplitude quantizing algorithm.

3. The constant magnification imaging method as in claim 2 wherein said step of establishing the resealing algorithm and the amplitude quantizing algorithm comprises the steps of:
    determining a signature from the signal source;
    performing an analysis of the signature;
    selecting optimal algorithms for the signature based upon the analysis; and
    utilizing the optimal algorithms for processing the input data.

4. The constant magnification imaging method as in claim 3 further comprising the step of:
    linking the optimal algorithms with the signature.

5. The constant magnification imaging method as in claim 4 further comprising the step of:
    storing the linked signature in a database.

6. The constant magnification imaging method as in claim 1 further comprising the step of:
    configuring a device to execute the preselected rescaling algorithm and the preselected amplitude quantizing algorithm; and
    enabling the device to perform said step of applying the preselected resealing algorithm and the preselected amplitude quantizing algorithm to the relatively low characteristic scan resolution, relatively high resolution amplitude input data.

7. The constant magnification imaging method as in claim 6 further comprising the step of configuring a programmable frame grabber to execute the preselected resealing algorithm and the preselected amplitude quantizing algorithm.

8. A constant magnification imaging method as in claim 1 further comprising the step of sampling by using at least one line scan camera.

9. A node in a computer network for carrying out the method according to claim 1.

10. A communications network comprising at least one node for carrying out the method according to claim 1.

11. A computer readable medium having instructions embodied therein for the practice of the method of claim 1.

12. A constant magnification imaging system comprising:
    a data collection subsystem for sampling an amplitude of a signal source at a relatively high resolution and for sampling said signal source at a relatively low characteristic scan resolution, said data collection subsystem providing relatively low characteristic scan resolution, relatively high resolution amplitude input data; and a data processing subsystem operably connected to said data collection subsystem, said data processing subsystem capable of real time conversion of said relatively low characteristic scan resolution, relatively high resolution amplitude input data to target scan resolution, relatively low resolution amplitude output data of constant magnification.

13. The constant magnification imaging system of claim 12 further comprising an algorithm selection subsystem, said algorithm selection subsystem operably connected to said data processing subsystem, said algorithm selection subsystem capable of establishing at least one algorithm in said data processing subsystem, said data processing subsystem capable of executing said at least one algorithm with respect to said relatively low characteristic scan resolution, relatively high resolution amplitude input data.

14. The constant magnification imaging system of claim 13 wherein said at least one algorithm is selected from the group consisting of rescaling algorithms and amplitude quantizing algorithms.

15. The constant magnification imaging system of claim 14 wherein said resealing at least one algorithm is capable of converting said relatively low characteristic scan resolution, relatively high resolution amplitude input data to target scan resolution, relatively high resolution amplitude constant magnification intermediate data.

16. The constant magnification imaging system of claim 15 wherein said amplitude quantizing algorithm is capable of converting said constant magnification intermediate data to target scan resolution, relatively low resolution amplitude output data.

17. The constant magnification imaging system of claim 12 wherein said data collection subsystem comprises a data collection device.

18. The constant magnification imaging system of claim 12 wherein said data processing subsystem executes a computer code, said computer code forming a data buffer having said relatively low characteristic scan resolution, relatively high resolution amplitude input data, said data buffer having a plurality of lines, said data buffer having an oldest line of data and a newest line of data, said computer code executing said at least one algorithm against said data buffer creating a single line of processed data, said single line of processed data capable of being transmitted to a computer memory, said oldest line of data being deleted after said single line is transmitted, receiving said newest line of relatively low characteristic scan resolution, relatively high resolution amplitude input data as they are sampled after said single line is transmitted.

19. The constant magnification imaging system of claim 12 wherein said data processing subsystem comprises a programmable frame grabber, said programmable frame grabber executing a computer code, said computer code forming a data buffer having said relatively low characteristic scan resolution, relatively high resolution amplitude input data, said data buffer having a plurality of lines, said data buffer having an oldest line of data and a newest line of data, said computer code capable of executing said at least one algorithm against said data buffer creating a single line of processed data, said single line being capable of transmitted to computer memory, said oldest line of data capable of being deleted after said single line is transmitted, receiving said newest line of relatively low characteristic scan resolution, relatively high resolution amplitude input data as they are sampled after said single line is transmitted.

20. The constant magnification imaging system of claim 12 wherein said data collection device comprises at least one line scan camera, said data processing subsystem comprises a programmable frame grabber, said programmable frame grabber executing a computer code, said computer code forming a data buffer having said relatively low characteristic scan resolution, relatively high resolution amplitude input data, said data buffer having a plurality of lines, said data buffer having an oldest line of data and a newest line of data, said computer code capable of executing said at least one algorithm against said data buffer creating a single line of processed data, said single line capable of being transmitted to computer memory, said oldest line of data capable of being deleted after said single line is transmitted, receiving said newest line of relatively low characteristic scan resolution, relatively high resolution amplitude input data as they are sampled after said single line is transmitted.

21. A constant magnification imaging method comprising the steps of:
  sampling reflected light amplitude of a signal source at a pre-selected first resolution while sampling surface area of the signal source at a pre-selected characteristic scan resolution to produce input data; and
  creating output data of constant magnification by applying a pre-selected resealing algorithm and a pre-selected amplitude quantizing algorithm to the input data in real-time, the output data having a target scan resolution,
  wherein the reflected light amplitude of the output data has a pre-selected second resolution, the pre-selected second resolution being lower than the pre-selected first resolution.

22. The constant magnification imaging method as in claim 21 further comprising the steps of:
  establishing the pre-selected resealing algorithm; and
  establishing the pre-selected amplitude quantizing algorithm.

* * * * *

UNITED STATES PATENT AND TRADEMARK OFFICE
CERTIFICATE OF CORRECTION

PATENT NO. : 7,463,783 B1 Page 1 of 1
APPLICATION NO. : 10/733705
DATED : December 9, 2008
INVENTOR(S) : Peter J. Dugan et al.

It is certified that error appears in the above-identified patent and that said Letters Patent is hereby corrected as shown below:

Col. 12, line 18 (claim 2): "resealing" should read --rescaling--
Col. 12, line 22 (claim 3): "resealing" should read --rescaling--
Col. 12, line 44 (claim 6): "resealing" should read --rescaling--
Col. 12, line 50 (claim 7): "resealing" should read --rescaling--
Col. 13, line 22 (claim 15): "resealing" should read --rescaling--
Col. 14, line 39 (claim 21): "resealing" should read --rescaling--
Col. 14, line 48 (claim 22): "resealing" should read --rescaling--

Signed and Sealed this

Tenth Day of February, 2009

JOHN DOLL
*Acting Director of the United States Patent and Trademark Office*